(12) United States Patent
Malik et al.

(10) Patent No.: US 9,321,310 B2
(45) Date of Patent: Apr. 26, 2016

(54) PINION NUT RETAINER

(71) Applicants: Rashid Malik, Rochester Hills, MI (US); Richard F Bardecki, Holly, MI (US)

(72) Inventors: Rashid Malik, Rochester Hills, MI (US); Richard F Bardecki, Holly, MI (US)

(73) Assignee: FCA US LLC, Auburn Hills, MI (US)

( * ) Notice: Subject to any disclaimer, the term of this patent is extended or adjusted under 35 U.S.C. 154(b) by 231 days.

(21) Appl. No.: 14/135,949

(22) Filed: Dec. 20, 2013

(65) Prior Publication Data

US 2015/0174956 A1 Jun. 25, 2015

(51) Int. Cl.
*F16B 39/10* (2006.01)
*B60B 27/06* (2006.01)
*F16B 35/00* (2006.01)

(52) U.S. Cl.
CPC .......... *B60B 27/065* (2013.01); *F16B 35/005* (2013.01); *F16B 39/10* (2013.01)

(58) Field of Classification Search
CPC .............................. B60B 27/06; B60B 27/065
USPC ................. 411/116, 117, 133, 166, 383, 517
See application file for complete search history.

(56) References Cited

U.S. PATENT DOCUMENTS

| | | | | |
|---|---|---|---|---|
| 2,472,742 | A * | 6/1949 | Brown | B60B 27/0026 180/340 |
| 5,647,814 | A * | 7/1997 | Krisher | F16H 48/08 475/230 |
| 6,609,765 | B2 * | 8/2003 | Radke | B60B 11/02 301/111.03 |
| 8,016,531 | B2 * | 9/2011 | White | F16B 39/10 301/105.1 |
| 8,534,770 | B2 * | 9/2013 | White | B60B 27/02 301/105.1 |
| 8,657,544 | B2 * | 2/2014 | Liu | F16D 1/096 411/266 |
| 8,689,445 | B2 * | 4/2014 | White | B60B 27/02 29/724 |
| 2012/0186390 | A1 * | 7/2012 | Cook | F16H 57/0025 74/640 |

\* cited by examiner

*Primary Examiner* — Robert Delisle
(74) *Attorney, Agent, or Firm* — Ralph E. Smith (57) ABSTRACT

An axle assembly is provided and includes an axle component, a pinion nut, and a retainer. The axle component has a recess that defines a wall portion. The pinion nut is received within the recess. The retainer is received within the recess and is disposed between the pinion nut and the wall portion. The retainer is movable between a compressed state and a first expanded state, whereby the compressed state permits movement of the retainer relative to the pinion nut and the first expanded state engages the pinion nut and the wall portion to restrict movement of the retainer relative to the pinion nut and the wall portion.

19 Claims, 8 Drawing Sheets

PINION NUT RETAINER

FIELD

The present disclosure relates to a retainer and more particularly to a retainer for a pinion nut.

BACKGROUND

This section provides background information related to the present disclosure which is not necessarily prior art.

Vehicles typically include an axle assembly that transfers and regulates torque from a drive shaft to one or more output shafts. Such output shafts may be coupled to other components such as a differential assembly and drive wheels of the vehicle to propel the vehicle during use.

Conventional axle assemblies additionally include a differential housing, a pinion shaft having a pinion gear that mates to a gear located within the differential housing, and an input flange that mates to a drive flange of the drive shaft. A pinion nut is typically threaded to the pinion shaft to secure the drive flange and pinion shaft to the differential housing.

Over time, the pinion nut may loosen, thereby causing the pinion shaft to develop increased axial play. Such axial play may increase wear on components associated with the differential assembly and, as a result, may reduce the life of the axle assembly.

SUMMARY

This section provides a general summary of the disclosure, and is not a comprehensive disclosure of its full scope or all of its features.

In one configuration, an axle assembly is provided and includes an axle component, a pinion nut, and a retainer. The axle component has a recess that defines a wall portion. The pinion nut is received within the recess. The retainer is received within the recess and is disposed between the pinion nut and the wall portion. The retainer is movable between a compressed state and a first expanded state, whereby the compressed state permits movement of the retainer relative to the pinion nut and the first expanded state engages the pinion nut and the wall portion to restrict movement of the retainer relative to the pinion nut and the wall portion.

In another configuration, a retainer for a pinion nut of an axle assembly having a flange is provided. The retainer includes a substantially annular body and an actuation mechanism. The substantially annular body has a gap formed between a first end of a first arm and a second end of a second arm. The body surrounds the pinion nut and is moveable between a compressed state and a first expanded state, whereby the compressed state permits movement of the body relative to the pinion nut and the flange and the first compressed state restricts movement of the body relative to the pinion nut and the flange. The actuation mechanism is associated with at least one of the first and second arms and moves the body between the compressed state and the first expanded state by causing movement of the first end relative to the second end.

A method is also provided and includes applying a force on a retainer to move the retainer from a first expanded state to a compressed state, inserting the retainer into a recess formed between an axle component and a pinion nut, and rotating the retainer relative to the pinion nut until the retainer contacts an outer surface of the pinion nut. The method also includes removing the force to cause the retainer to move from the compressed state to the first expanded state and engaging the pinion nut and the axle component upon movement into the first expanded state to restrict rotation of the pinion nut relative to the axle component.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure is directed to a retainer for retaining a pinion nut on an axle assembly having a flange, an axle assembly incorporating such a retainer, and a method for restricting rotation of a pinion nut using such a retainer. The axle assembly can be of any kind that receives input torque from a drive shaft and provides output torque to an output shaft, such as a front, rear, or center differential in a vehicle, for example. The axle assembly can be incorporated in a vehicle, such as an automobile, sport-utility vehicle, truck, aircraft, watercraft, tractor, machine, or any other vehicle having a drive shaft coupled to a differential. However, it is also contemplated that the axle assembly can be located on machinery other than vehicles.

Figure 1:
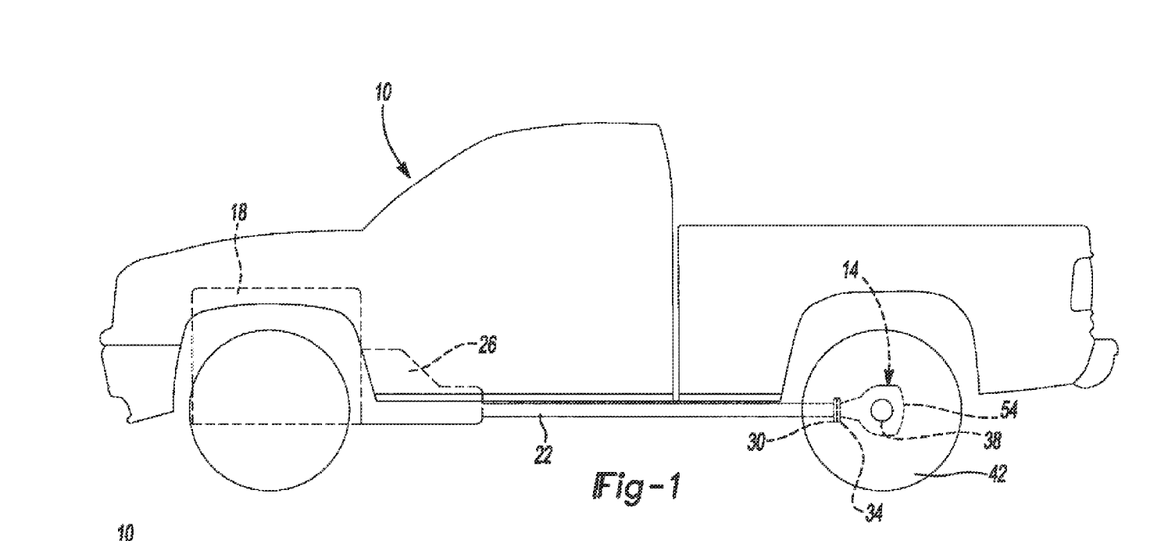
FIG. 1 is a schematic view of a vehicle including a drive shaft and axle assembly in accordance with the principles of the present disclosure.
Figure 2:
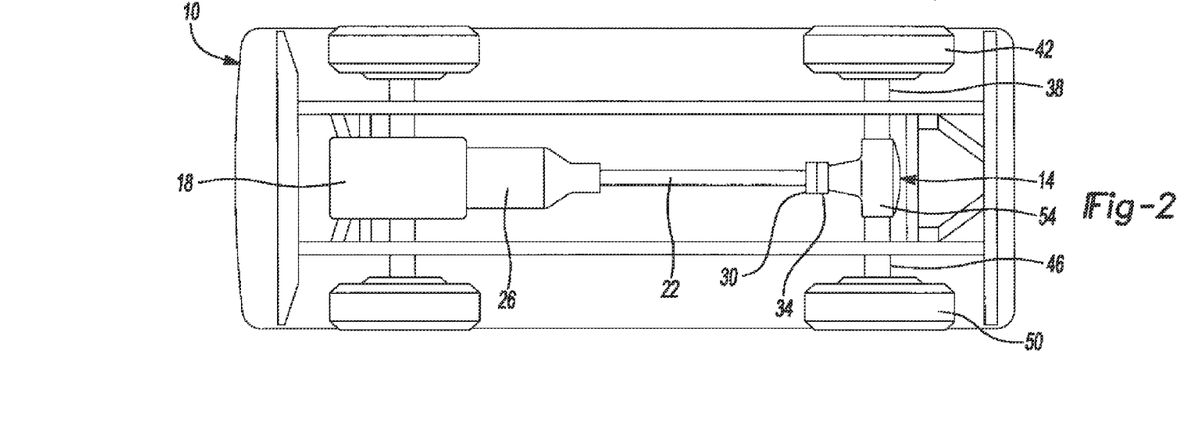
FIG. 2 is a bottom view of the vehicle of FIG. 1.

FIG. 1 illustrates a side view of an exemplary vehicle 10 having an axle assembly 14. FIG. 2 illustrates a bottom view of the vehicle 10. The vehicle 10 has a power plant 18 coupled to a drive shaft 22. The power plant 18 may be of any type such as an internal combustion engine, electric motor, or a hybrid electric motor, for example. The vehicle 10 may include a transmission 26 that couples the power plant 18 to the drive shaft 22.

The drive shaft 22 has a drive flange 30 that couples the drive shaft 22 to a mating input flange 34 on the axle assembly 14. The axle assembly 14 transfers torque received from the drive shaft 22 to a first output shaft 38 such as a drive axle, for example. The first output shaft 38 is coupled to a wheel 42 for propelling the vehicle 10. Likewise, the axle assembly 14 transfers torque to a second output shaft 46, whereby the second output shaft 46 is coupled to a second wheel 50 for propelling the vehicle 10. While not specifically described or shown, the axle assembly 14 may also transfer torque to additional wheels or other output shafts.

Figure 3:
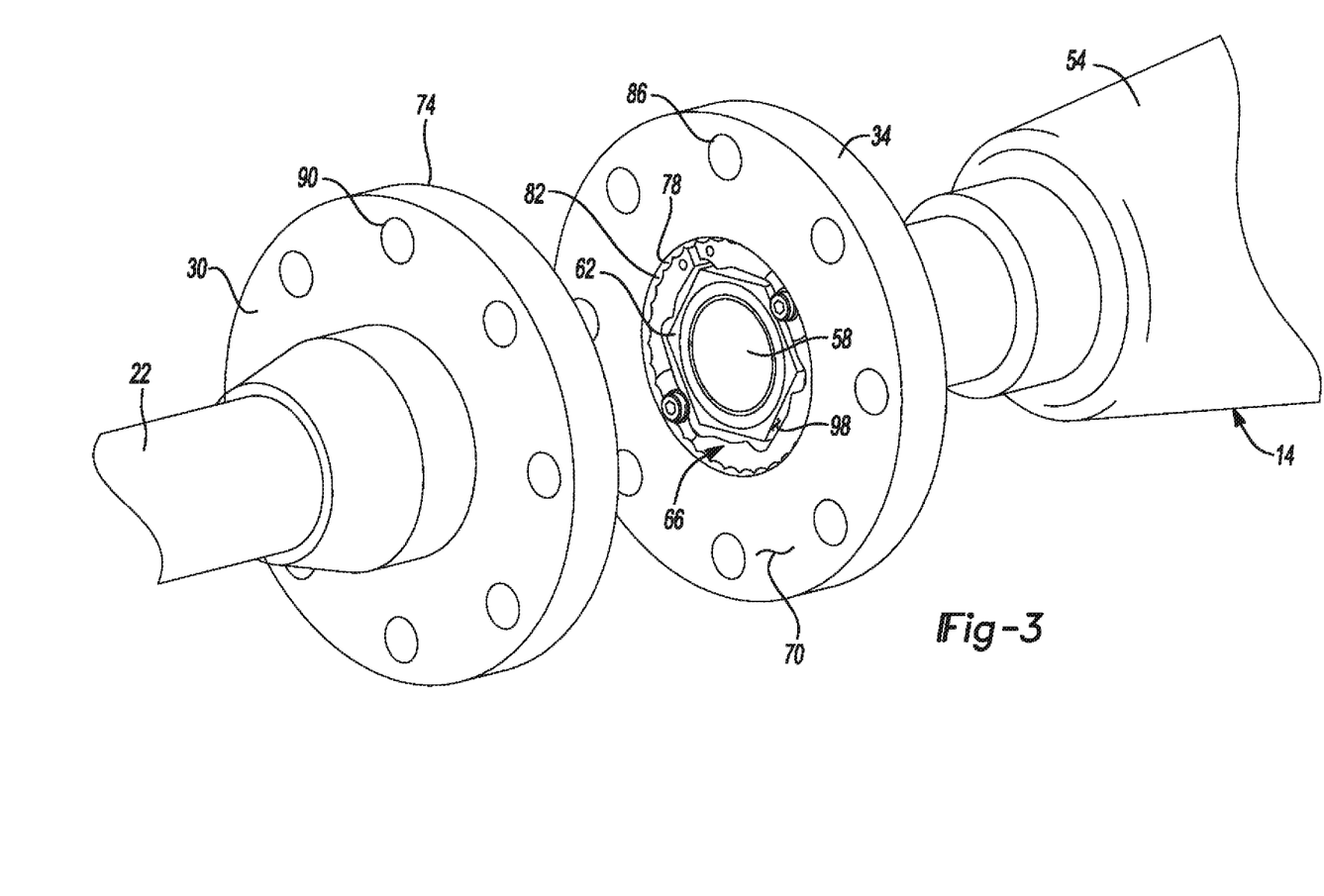
FIG. 3 is a partial exploded view of the axle assembly of FIG. 1 showing a pinion nut retainer in accordance with the principles of the present disclosure.

FIG. 3 illustrates a partial exploded view of the drive shaft 22 disconnected from the axle assembly 14. The drive shaft 22 includes the drive flange 30 disposed at an end of the drive shaft 22 proximate to the axle assembly 14. The axle assembly 14 includes the input flange 34, a differential housing 54, a pinion shaft 58, a pinion nut 62, and a retainer 66. The input flange 34 includes a first surface 70 that couples to a mating surface 74 of the drive flange 30, and a recess 78 defining a wall portion 82. The first surface 70 and the mating surface 74 may each include at least one aperture 86, 90 that receives a fastener (not shown) to couple the drive flange 30 and the input flange 34. The fastener can be of any type such as a bolt secured by a nut. The fastener couples the drive flange 30 to the input flange 34 to fix the pinion shaft 58 for rotation with the drive shaft 22. The first surface 70 and the mating surface 74 may further include a piloting feature (not shown). The piloting feature can be a protrusion extending from one of the first surface 70 and the mating surface 74 and a matching recess extending into the other of the first surface 70 and the mating surface 74, to ensure proper alignment of the input flange 34 with the drive flange 30.

The recess 78 defines a central bore 94 (FIG. 9) extending through the input flange 34. The pinion shaft 58 extends through the central bore 94 and into the differential housing 54. The pinion nut 62 is disposed within the recess 78 and is threadably engaged with the pinion shaft 58 to couple the input flange 34 to the pinion shaft 58 such that the input flange 34 is fixed for rotation with the pinion shaft 58.

Figure 9:
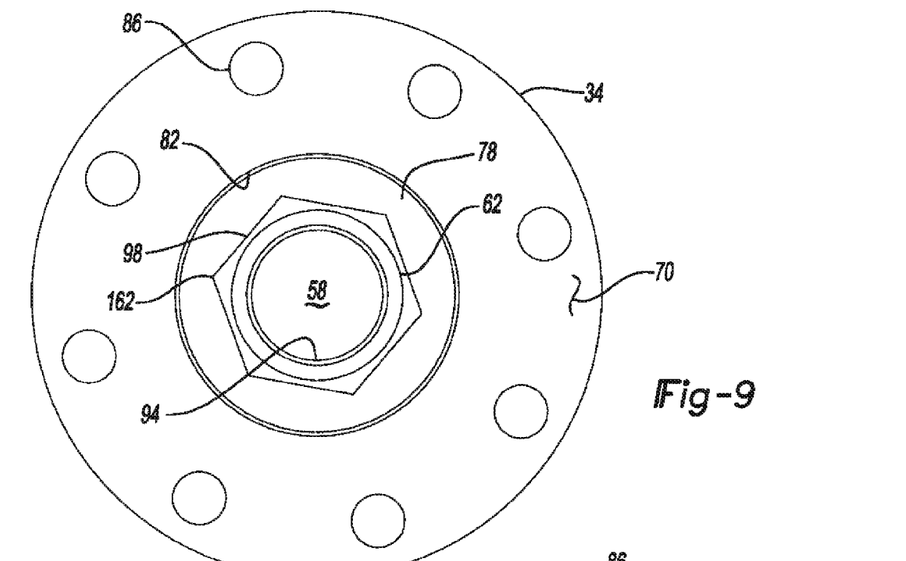
FIG. 9 is a front view of the axle assembly of FIG. 3 showing a pinion nut prior to installation of the retainer.

When the pinion nut 62 is disposed within the recess 78, the pinion nut 62 is disposed between the pinion shaft 58 and the wall portion 82 of the recess 78 (FIG. 9). The retainer 66 is configured to be disposed between the pinion nut 62 and the wall portion 82. When fully installed, the retainer 66 engages an outer surface 98 of the pinion nut 62 and the wall portion 82 of the recess 78 to restrict the pinion nut 62 from rotating relative to the pinion shaft 58, as will be described in further detail below.

Figure 4:
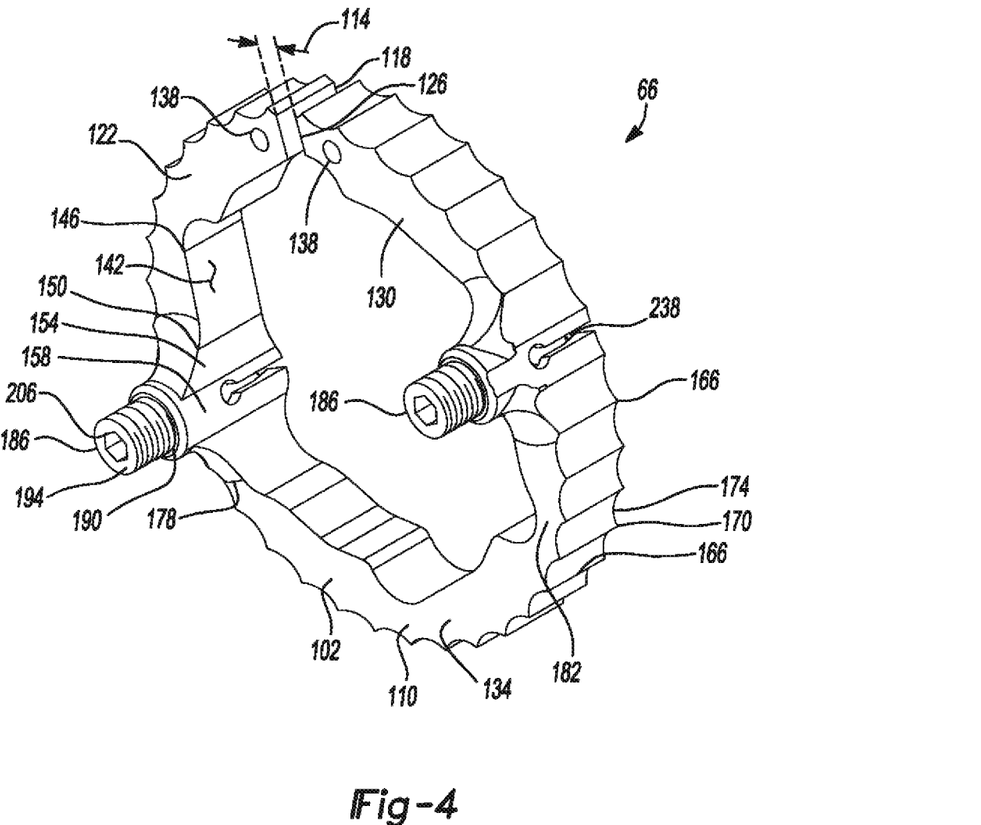
FIG. 4 is a perspective view of the retainer of FIG. 3.
Figure 5:
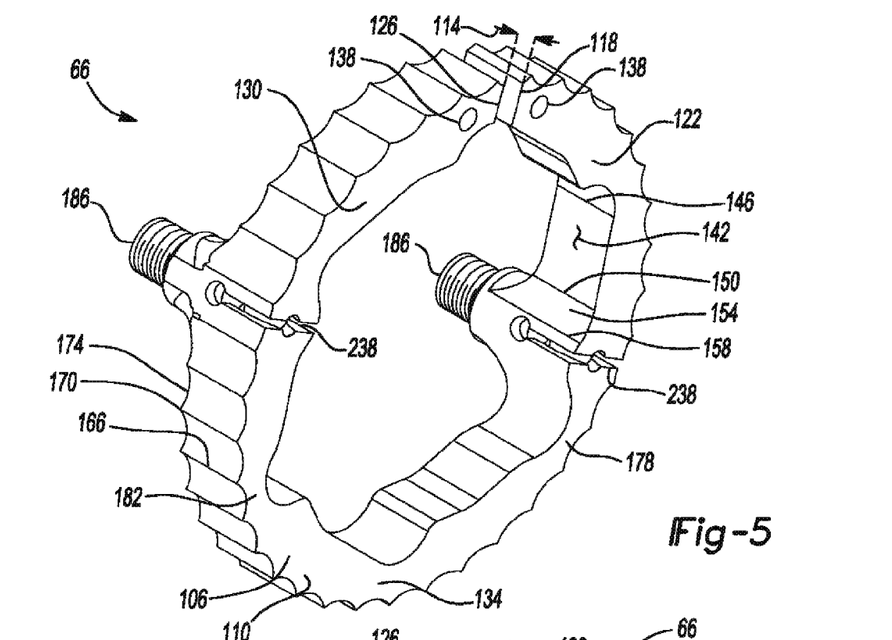
FIG. 5 is a perspective view of the retainer of FIG. 3.
Figure 6:
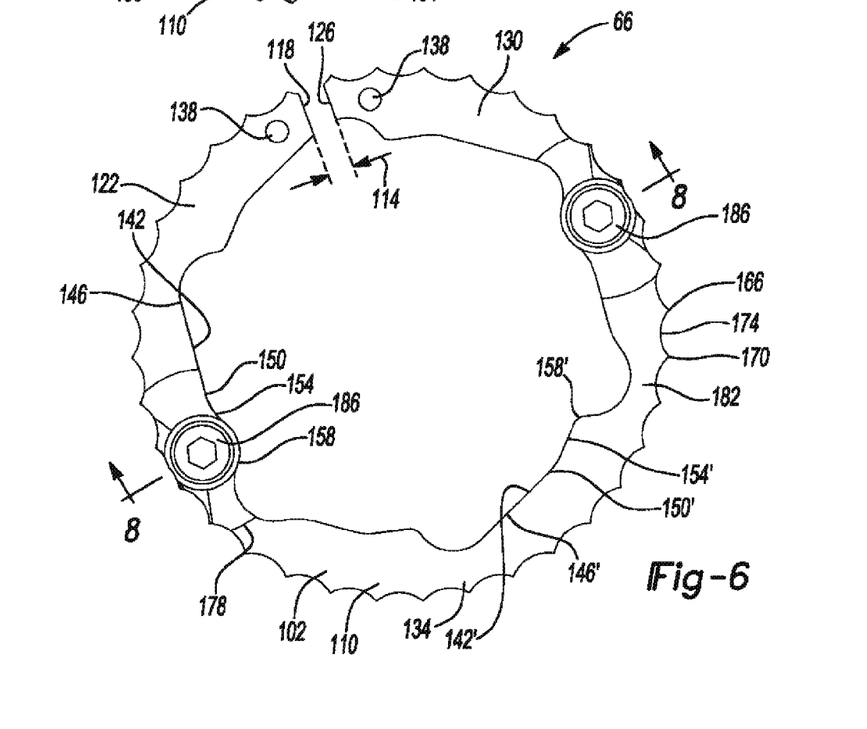
FIG. 6 is a front view of the retainer of FIG. 3.
Figure 7:
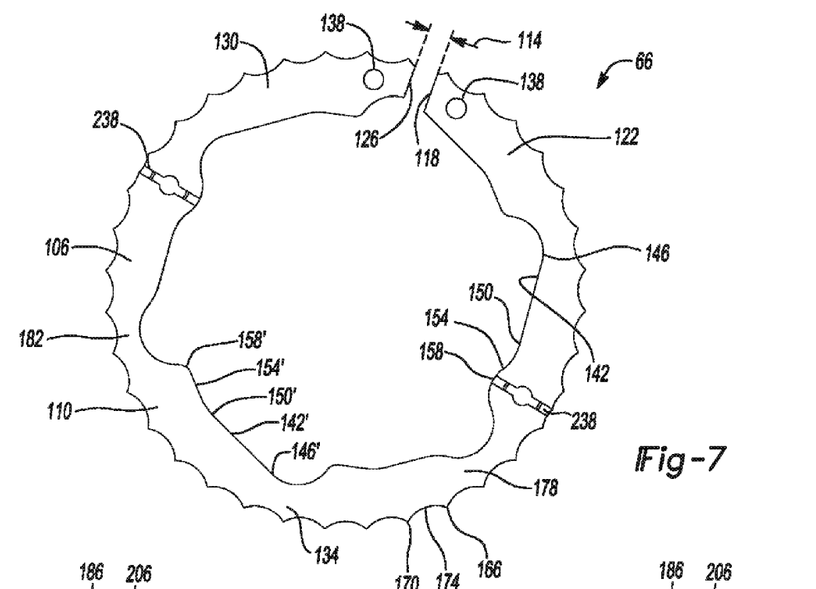
FIG. 7 is a rear view of the of the retainer of FIG. 3.

FIGS. 4 and 5 respectively illustrate front and rear perspective views of the retainer 66. FIGS. 6 and 7 respectively illustrate front and rear views of the retainer 66 showing front and rear sides of the retainer 66.

The retainer 66 includes a main body 110 having a substantially C-shape that defines a gap 114 formed between a first end 118 of a first arm 122 and a second end 126 of a second arm 130. As shown in FIG. 4, the first arm 122 is coupled to the second arm 130 at a junction 134 of the first arm 122 and the second arm 130.

Figure 10:
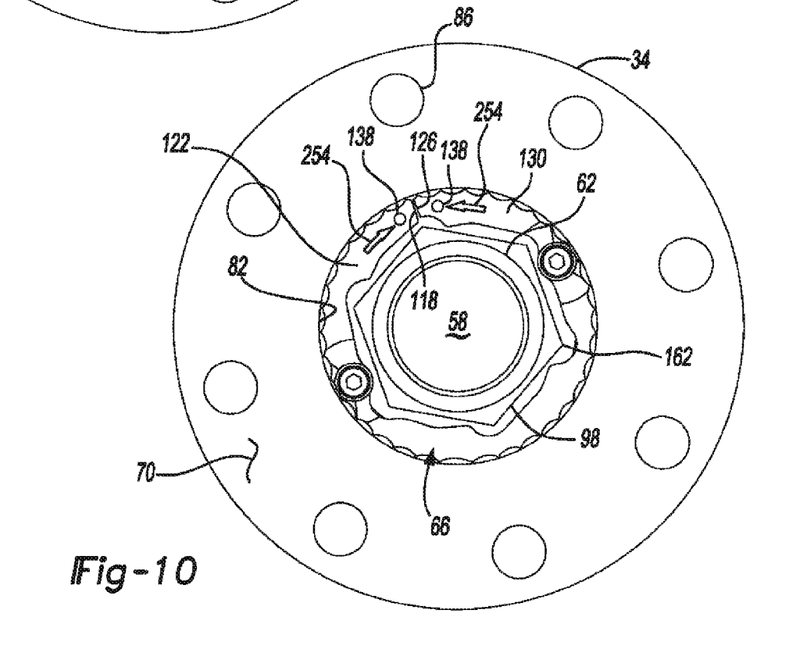
FIG. 10 is a front view of the axle assembly of FIG. 3 showing the retainer in a compressed state.

The retainer 66 can include a pair of orifices 138 respectively formed in each of the first and second arms 122, 130. The orifices 138 may be disposed proximate to the first and second ends 118, 126 and are sized to receive a tool (not shown) therein. The orifices 138 act as an actuation mechanism to articulate the first and second arms 122, 130 between a first expanded or relaxed state (FIG. 6) and a compressed state (FIG. 10). Specifically, the first and second arms 122, 130 may be articulated inward from the first expanded state to the compressed state. In the first expanded state, the gap 114 has a first dimension and in the compressed state, the gap 114 has a second dimension that is less than the first dimension. However, it is also contemplated that other features besides orifices—such as protrusions, for example—can be used in conjunction with appropriate tools to move the retainer 66 between the expanded and the compressed states.

The inner radial periphery of the retainer 66 includes a cam surface 142 that engages the outer surface 98 of the pinion nut 62 to restrict rotation of the pinion nut 62 relative to the input flange 34 once installed. The cam surface 142 begins at a first location 146 on the main body 110 and extends to a second location 150 on the main body 110 (FIGS. 4 and 5). A thickness of the main body 110 may gradually increase in the radial direction extending from the first location 146 to the second location 150. The cam surface 142 translates a rotational force received from the pinion nut 62 to a radially expansive force on the main body 110. Namely, the cam surface 142 maximizes the radially expansive component of the force by causing a force applied to the retainer 66 at the cam surface 142 to be directed to the wall portion 82. Directing the force to the wall portion 82 is accomplished in large part by the increase in wall thickness of the retainer 66 from the first location 146 to the second location 150.

The inner radial periphery may also include a stop surface 154. The stop surface 154 extends from the cam surface 142 at the second location 150, to a third location 158. The main body 110—at the third location 158—includes a thickness such that an outermost radial portion 162 of the pinion nut 62 cannot rotate past the third location 158 when the retainer 66 is located between the pinion nut 62 and the wall portion 82 of the input flange 34. The cam surface 142 and stop surface 154 are repeated around the inner periphery of the retainer 66 to engage the pinion nut 62 in one or more locations along the outer surface 98 of the pinion nut 62, shown by cam surface 142', first location 146', second location 150', stop surface 154', and third location 158' (FIG. 6). For example, the cam surface 142 and stop surface 154 may be repeated six (6) times, as shown in FIG. 6.

The outer radial periphery of the retainer 66 includes a plurality of outer projections 166. The outer projections 166 can extend around substantially the entire outer radial periphery of the retainer 66 between the first end 118 and the second end 126. The outer projections 166 can include a plurality of peaks 170 connected by a plurality of valleys 174. The number of peaks 170 can be described by a ratio of peaks to an outer diameter of the retainer 66 to optimize contact pressure at each peak 170. For instance, the ratio of peaks to diameter can be between 0.64-0.85 peaks/mm for example, though other ratios can be used depending on the hardness of the input flange 34 and the retainer 66, or the geometry of the outer projections 166. The outer projections 166 engage the wall portion 82 of the input flange 34 to restrict rotation of the retainer 66 and, thus, the pinion nut 62 relative to the wall portion 82, as will be further described.

The main body 110 can additionally include a first hinge 178 located at a first reduced-width portion of the retainer 66 generally between the junction 134 and one of the first and second ends 118, 126. The first hinge 178 allows the main body 110 to deflect at the first hinge 178 to allow the retainer 66 to move between the first expanded state and the compressed state. The main body 110 can also include a second hinge 182 located at a second reduced-width portion of the retainer 66 generally between the junction 134 and the other of the first and second ends 118, 126.

The first reduced-width portion and the second reduced-width portion of the main body 110 that have the smallest cross-sectional area. As such, the first reduced-width portion and the second reduced-width portion provide the main body 110 with localized areas of reduced thickness to cause movement of the arms 122, 130 at the first and second hinges 178, 182 when the arms 122, 130 are subjected to a force that causes the arms 122, 130 to move toward, or away from one another.

Figure 8:
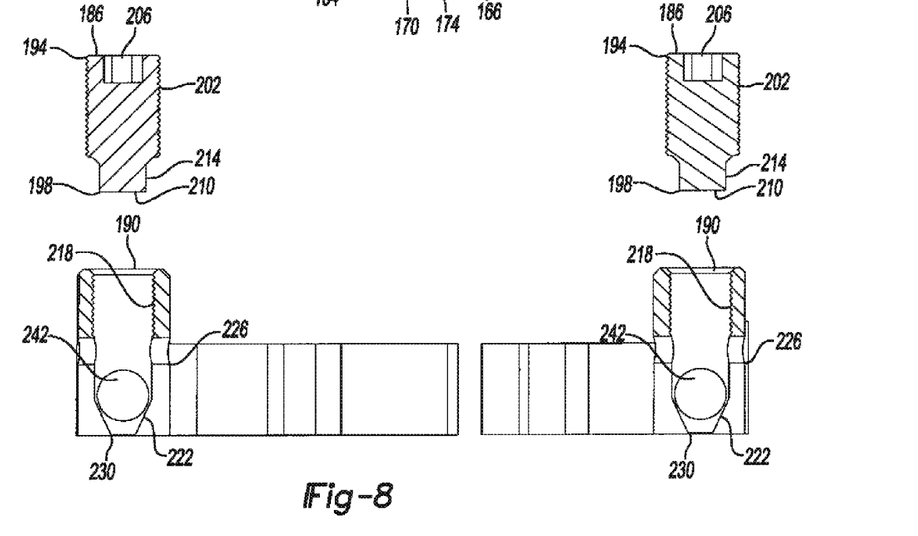
FIG. 8 is a cross-sectional view of the retainer of FIG. 3 taken along line 8-8 of FIG. 6 and shown in a relaxed state.
Figure 12:
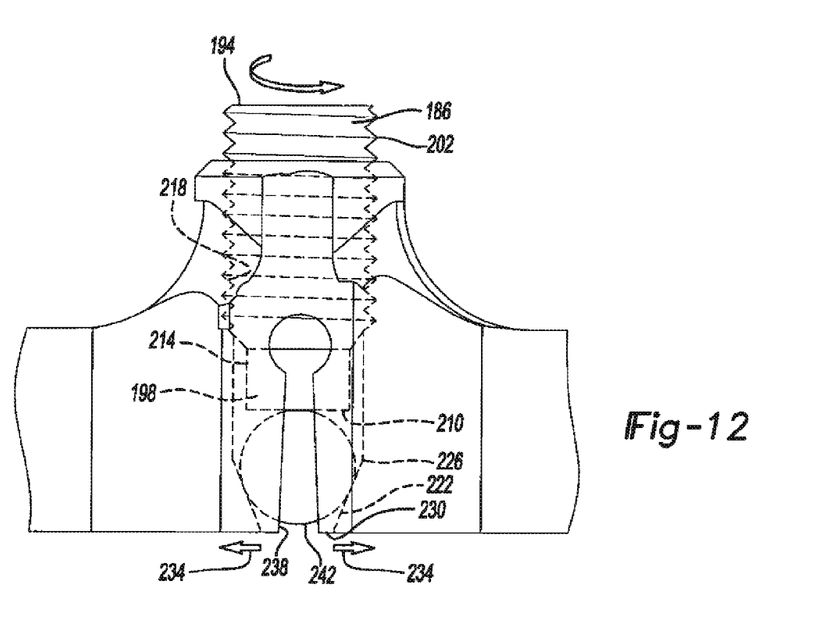
FIG. 12 is a partial side view of the retainer of FIG. 3 showing an expansion device of the retainer.
Figure 13:
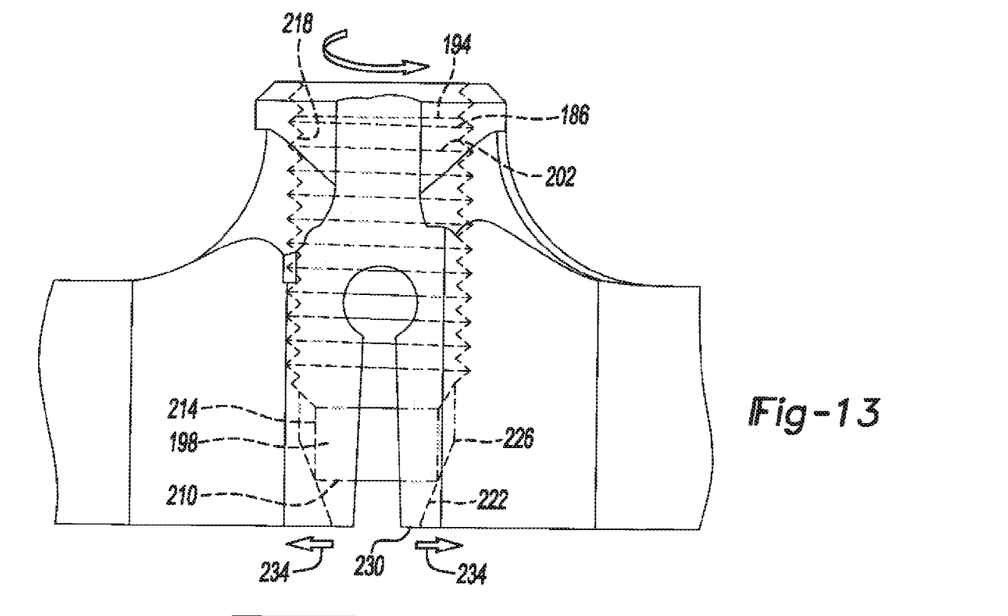
FIG. 13 is a partial side view of the retainer of FIG. 3 showing another expansion device of the retainer.

The retainer 66 can include at least one fastener such as a set screw 186 received by at least one orifice 190 of the main body 110. FIGS. 8, 12, and 13 illustrate the set screw 186 and orifice 190 in greater detail. While the figures illustrate two set screws 186, it is understood that a single set screw 186, or more than two set screws 186 may be utilized. The set screw 186 includes a driving end 194 and a driven end 198, whereby the driving end 194 includes an externally threaded portion 202 having a major diameter and a minor diameter and a driving feature 206. The driving feature 206 can have an internal surface that accepts a tool (not shown) to rotate the set screw 186 relative to the retainer 66, such as an allen wrench or screw driver, for example, or can have an external surface for interfacing with a suitable tool, such as a socket wrench, for example. The driven end 198 includes a tip 210 having a substantially smooth surface 214 and a diameter less than or equal to the minor diameter of the externally threaded portion 202.

The orifice 190 includes an internally threaded portion 218 and a substantially smooth tapered portion 222. The internally threaded portion 218 engages the externally threaded portion 202 of the set screw 186 when the set screw 186 is received within the orifice 190. The smooth tapered portion 222 tapers from a first end 226 proximate to the internally threaded portion 218 and having a first diameter, to a second end 230 distal to the internally threaded portion 218 and having a second diameter, whereby the second diameter is smaller than the first diameter. The set screw 186 acts as an actuation mechanism once the retainer 66 is installed in the input flange 84 to expand the main body 110 to a second expanded state—from the first expanded state—by driving the set screw 186 into the orifice 190. In so doing, the main body 110 is expanded in a first direction 234 (FIGS. 12 and 13) by expanding the smooth tapered portion 222 when the set screw 186 is driven into the orifice 190.

The main body 110 further defines a slot 238 extending into the smooth tapered portion 222. The slot 238 extends from either the inner radial periphery, the outer radial periphery, or both, and can extend through the rear side 106 of the retainer 66. The slot 238 allows the main body 110 to readily expand in the first direction 234 when the set screw 186 is driven into the orifice 190 a predetermined distance, and/or to a predetermined torque.

As can be seen in FIGS. 8 and 12, the retainer 66 may include a bearing 242 disposed within the orifice 190 between the set screw 186 and the second end 230 of the smooth tapered portion 222. The bearing 242 includes a diameter less than or equal to the minor diameter and greater than the second diameter of the smooth tapered portion 222. Accordingly, the tip 210 forces the bearing 242 into the smooth tapered portion 222 to cause the main body 110 to expand in the first direction 234.

FIG. 13 illustrates another configuration of the retainer 66, whereby the tip 210 of the set screw 186 directly contacts the smooth tapered portion 222 to directly cause the main body 110 to expand in the first direction 234. Namely, the tip 210 of the set screw 186 has a diameter that is larger than the diameter of the smooth tapered portion 222, which causes the tip 210 to exert a force on the main body 110—at the orifice 190—when the set screw 186 is driven a predetermined distance into the orifice 190, and/or to a predetermined torque.

FIGS. 9-14 generally illustrate the steps for installing the retainer 66 in the input flange 34. FIG. 9 illustrates a front view of the input flange 34, pinion shaft 58, and pinion nut 62 without the retainer 66. The input flange 34 is disposed about the pinion shaft 58, with the pinion shaft 58 extending through the central bore 94. The pinion nut 62 is threadably coupled to the pinion shaft 58 and is disposed within the recess 78 to couple the input flange 34 to the pinion shaft 58.

Figure 14:
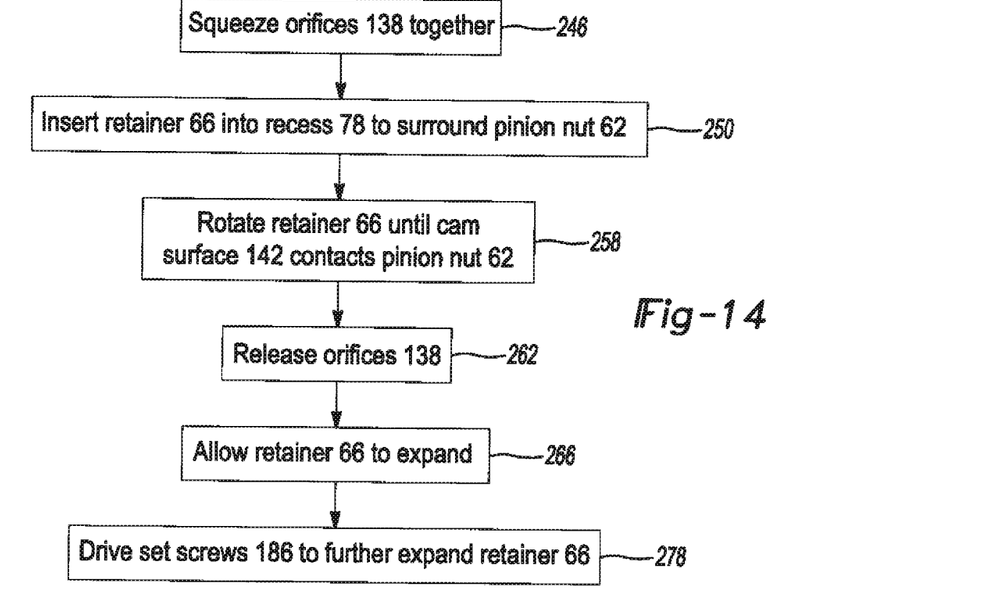
FIG. 14 is a flow chart detailing a method of installation of the retainer of FIG. 3 on the axle assembly.

FIG. 10 illustrates a front view of the retainer 66 during installation steps 246-250 of FIG. 14. The first and second arms 122, 130 are squeezed together to reduce the gap 114 and articulate the retainer 66 to the compressed state. The first and second arms 122, 130 can be compressed by applying a compressive force in the direction of arrows 254 to the orifices 138. In the compressed state, the retainer 66 can fit between the wall portion 82 of the recess 78 and the outer surface 98 of the pinion nut 62. The retainer 66 is inserted into the recess 78 to surround the pinion nut 62 such that the retainer 66 is disposed radially between the pinion nut 62 and the wall portion 82 of the recess 78.

Figure 11:
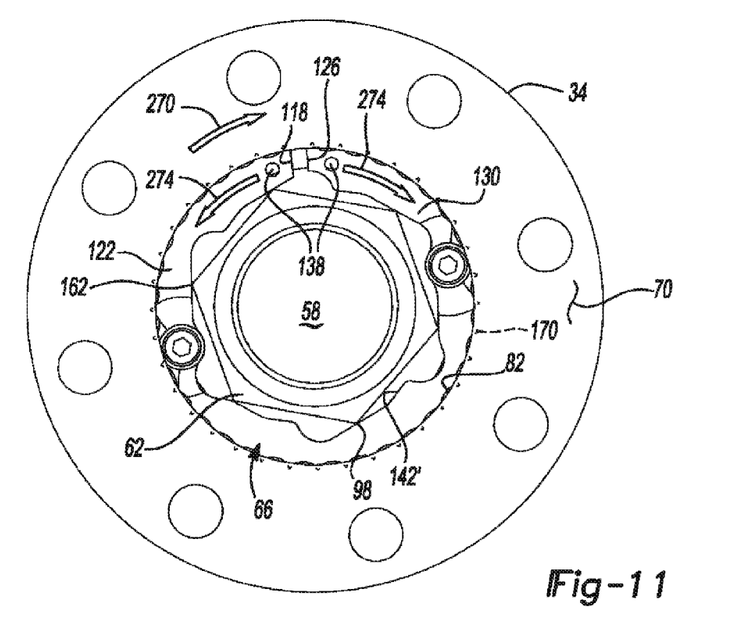
FIG. 11 is a front view of the axle assembly of FIG. 3 showing the retainer in an expanded state.

FIG. 11 illustrates a front view of the retainer 66 during installation steps 258-266 of FIG. 14. While still compressed, the retainer 66 is rotated in a clockwise direction 270 (for standard pinion nut 62, or in a counter-clockwise direction for reverse, or left-hand pinion nut 62) until the cam surface 142 contacts the pinion nut 62. The retainer 66 is subsequently released and allowed to expand from the compressed state in directions 274 (FIG. 11).

The retainer 66 may also be further rotated while moving between the compressed state and the first expanded state to ensure contact between the cam surface 142 and the pinion nut 62 while in the first expanded state. The retainer 66—in a relaxed state—is radially larger than the recess 78, which causes the outer projections 166 to contact the wall portion 82 of the recess 78. The main body 110 includes a hardness that is greater than a hardness of the input flange 34. For example, the input flange 34 may be approximately 20-28 HRC while the main body 110 is approximately 38-42 HRC on the Rockwell hardness scale. Other hardness values can be used where the main body 110 is harder than the input flange 34. Because the main body 110 is harder than the input flange 34, the outer projections 166 cause local deformation of the wall portion 82 of the recess 78 when the retainer 66 expands therein. This deformation helps restrict movement of the retainer 66 relative to the input flange 34.

FIGS. 12 and 13 illustrate side views of orifice 190, set screw 186, and slot 238 of the retainer 66 in the first and second configurations during step 278 of FIG. 14. After initial expansion in direction 274 and during step 278, the set screw 186 is driven into the orifice 190 to expand the main body 110 in the first direction 234. FIG. 12 illustrates the first configuration wherein the set screw 186 is driven into a bearing 242 located in the orifice 190 between the set screw 186 and the smooth tapered portion 222. The bearing 242 is forced into the smooth tapered portion 222 to expand the main body 110. The slot 238 can be included to ensure the main body 110 primarily expands in the first direction 234 to expand the slot 238. FIG. 13 illustrates the second configuration wherein the set screw 186 is driven directly into the smooth tapered portion 222 to expand the main body 110. The slot 238 can also be included in this configuration. The expansion of the main body 110 in the first direction 234 applies further pressure by the outer projections 166 on the wall portion 82 of the recess 78 to prevent the retainer 66, and thus the pinion nut 62, from rotating.

Regardless of the particular configuration utilized (i.e., that of FIG. 12 or that of FIG. 13), driving the set screw 186 a predetermined distance into the orifice 190, and/or to a predetermined torque, causes expansion of each arm 122, 130, at the respective slots 238 of each arm 122, 130. Expansion of the arms 122, 130 at the respective slots 238 causes each arm 122, 130 to move in the first direction 234 such that movement of the arms 122, 130 causes the projection 166 of the retainer 66 to engage and deform portions of the wall portion 82, thereby fixing a position of the retainer 66 relative to the input flange 34.

As described, the retainer 66 is first inserted into an area between the pinion nut 62 and the wall portion of the input flange 34 in the compressed state. The retainer 66 is then rotated until the cam surface 142 of the retainer 66 contacts the pinion nut 62. At this point, the force applied to the retainer 66 at the orifices 138 is released to allow the retainer 66 to move from the compressed state to the relaxed or first expanded state. At this point, the pinion nut 62 is in contact with both the pinion nut 62 at the cam surface 142 and is likewise in contact with the wall portion 82 of the input flange 34.

The retainer 66 may be moved from the first expanded state to a second expanded state by driving the set screws 186 into the respective orifices 190 of the arms 122, 130. Upon sufficient movement of the set screws 186 into the respective orifices 190, the arms 122, 130 expand in the first direction 234, thereby causing the retainer 66 to move from the first expanded state to the second expanded state. At this point, the outer projections 166 of the retainer 66 locally deform areas of the wall portion 82 to fix a position of the outer projections 166 and, thus, the retainer 66, relative to the wall portion 82. The outer projections 166 deform the wall portion 82, as a hardness of the retainer 66 is greater than that of the input flange 34.

Moving the retainer 66 into the second expanded state restricts rotation of the pinion nut 62 in a counter-clockwise direction (CCW) relative to the view shown in FIG. 11. Namely, the outer surface 98 of the pinion nut 62 is in contact with the cam surface 142 of the retainer 66 and, as such, the cam surface 142 prevents counter-clockwise rotation of the pinion nut 62 relative to the input flange 34. Further, because a thickness of the retainer 66 increases along the cam surface 142 from the first location 146 to the second location 150, should the pinion nut 62 be rotated in the counter-clockwise direction relative to the view shown in FIG. 11, the increased thickness of the retainer 66 at the cam surface 142 restricts such movement. Accordingly, the retainer 66 cooperates with the wall portion 82 of the input flange 34 to restrict rotation of the pinion nut 62 in the counter-clockwise direction relative to the view shown in FIG. 11. Accordingly, removal of the pinion nut 62 from the pinion shaft 58 is prohibited.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An axle assembly comprising:
   an axle component having a recess defining a wall portion;
   a pinion shaft disposed within the recess;
   a pinion nut received within said recess and threadably engaged to said pinion shaft to couple said axle component to said pinion shaft; and
   a retainer received within said recess and disposed between said pinion nut and said wall portion, said retainer movable between a compressed state permitting movement of said retainer relative to said pinion nut and a first expanded state engaging said pinion nut and said wall portion to restrict movement of said retainer relative to said pinion nut and said wall portion.

2. The axle assembly of claim 1, wherein said retainer is movable from said first expanded state to a second expanded state to further engage said wall portion.

3. The axle assembly of claim 1, wherein said retainer includes a substantially C-shape having a gap formed between a first end of a first arm and a second end of a second arm, said first arm and said second arm moving away from one another to widen said gap when said retainer is moved from said compressed state to said first expanded state.

4. The axle assembly of claim 3, wherein said retainer includes a fastener located along at least one of said first arm and said second arm, said fastener operable to move said retainer from said first expanded state to a second expanded state when driven into said at least one of said first arm and said second arm, to further engage said wall portion.

5. The axle assembly of claim 1, wherein said retainer includes a cam surface operable to radially expand said retainer when said cam surface receives a rotational force from said pinion nut.

6. The axle assembly of claim 1, wherein said retainer includes a plurality of outer projections, said outer projections engaging said wall portion when in said first expanded state.

7. The axle assembly of claim 6, wherein said outer projections are configured to cause local deformation of said wall portion to restrict movement of said retainer relative to said wall portion when in said first expanded state.

8. A retainer for a pinion nut of an axle assembly having a flange and a pinion shaft threadably engaged to the pinion nut, the retainer comprising:
   a substantially annular body having a gap formed between a first end of a first arm and a second end of a second arm, said body surrounding the pinion nut and moveable between a compressed state permitting rotation of said body relative to the pinion nut and a first expanded state restricting rotation of said body relative to the pinion nut and the flange; and
   an actuation mechanism associated with at least one of said first arm and said second arm and operable to move said body between said compressed state and said first expanded state by causing movement of said first end relative to said second end.

9. The retainer of claim 8, wherein said actuation mechanism includes a first orifice located along said first arm and a second orifice located along said second arm, said first and second orifices configured to accept a tool to move said retainer between said compressed state and said first expanded state.

10. The retainer of claim 8, wherein said actuation mechanism includes a fastener located along at least one of said first arm and said second arm, said fastener operable to move said retainer from said first expanded state to a second expanded state when driven into said at least one of said first arm and said second arm.

11. The retainer of claim 10, further comprising outer projections located along an outer periphery of said annular body, wherein said outer projections cause local deformation of the flange when said retainer is moved from said first expanded state to said second expanded state.

12. The retainer of claim 8, further comprising a cam surface located along an inner periphery of said annular body, said cam surface operable to engage the pinion nut and radially expand said retainer when said cam surface receives a rotational force from said pinion nut.

13. The retainer of claim 8, further comprising outer projections located along an outer periphery of said annular body, said outer projections engaging the flange when in said first expanded state.

14. The retainer of claim 13, wherein said outer projections are configured to cause local deformation of the flange when said retainer is moved from said compressed state to one of said first expanded state and said second expanded state to restrict movement of said retainer relative to the flange.

15. A method comprising:
   applying a force to a retainer to move said retainer from a first expanded state to a compressed state;
   inserting said retainer into a recess formed between an axle component and a pinion nut;
   rotating said retainer relative to said pinion nut until said retainer contacts an outer surface of said pinion nut;
   removing said force to cause said retainer to move from said compressed state to said first expanded state; and
   engaging said pinion nut and said axle component upon movement into said first expanded state to restrict rotation of said pinion nut relative to said axle component.

16. The method of claim 15, further comprising moving said retainer into a second expanded state to further engage said axle component.

17. The method of claim 16, wherein said moving said retainer into said second expanded state includes causing local deformation of said axle component.

18. The method of claim 16, wherein said moving said retainer into said second expanded state includes driving a fastener into said retainer.

19. The method of claim 15, wherein said rotating said retainer relative to said pinion nut includes rotating said retainer until an inner cam surface of said retainer contacts said outer surface of said pinion nut.

* * * * *